No. 856,024.  
PATENTED JUNE 4, 1907.  
A. D. BROONER.  
WAGON RUNNING GEAR.  
APPLICATION FILED MAR. 22, 1906.
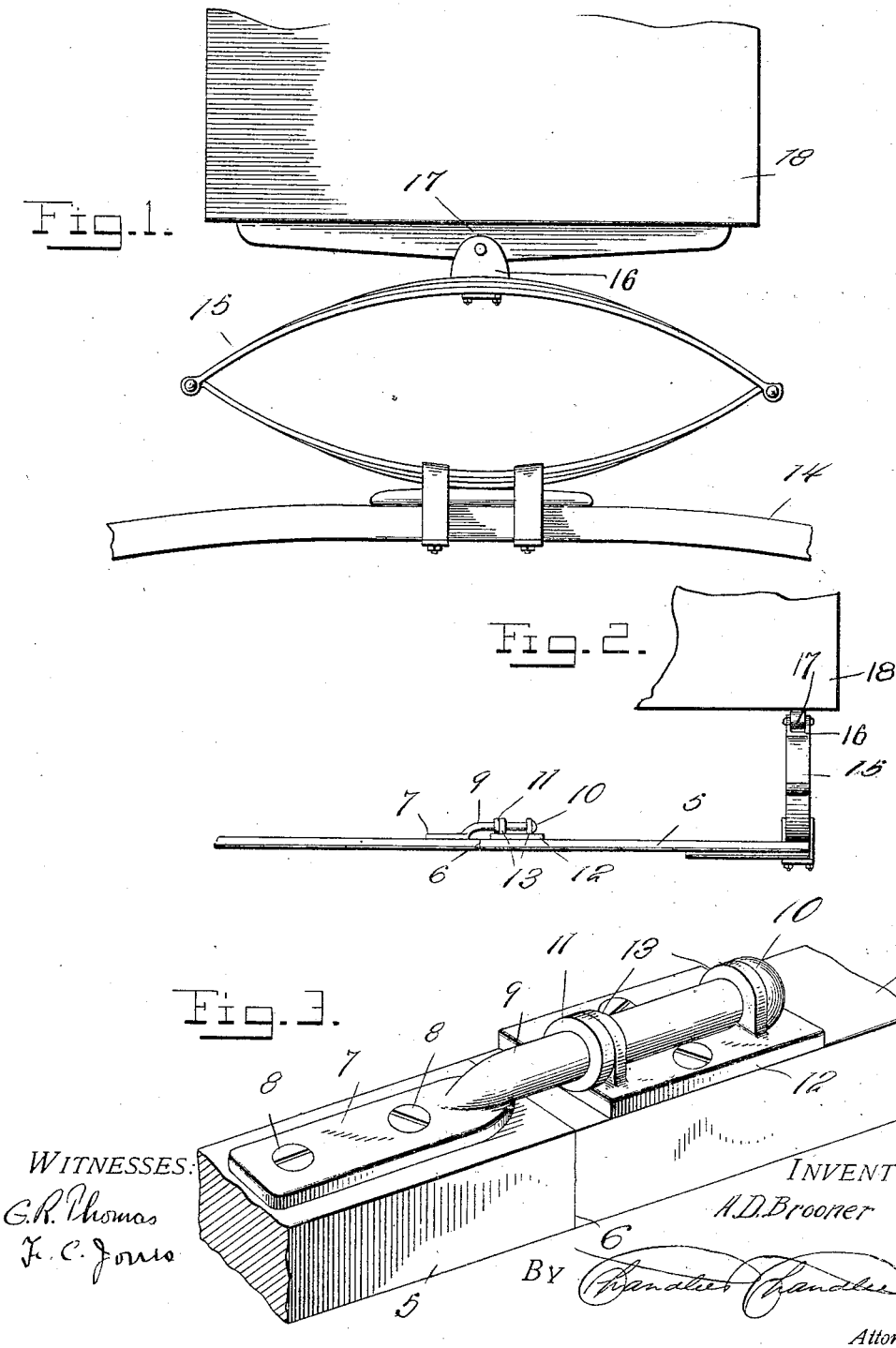

UNITED STATES PATENT OFFICE.

ALLEN D. BROONER, OF POMONA, MISSOURI.

WAGON RUNNING-GEAR.

No. 856,024.     Specification of Letters Patent.     Patented June 4, 1907.

Application filed March 22, 1906. Serial No. 307,483.

*To all whom it may concern:*

Be it known that I, ALLEN D. BROONER, a citizen of the United States, residing at Pomona, in the county of Howell, State of Missouri, have invented certain new and useful Improvements in Wagon Running-Gear; and I do hereby declare the following to be a full, clear, and exact description of the invention, such as will enable others skilled in the art to which it appertains to make and use the same.

This invention relates to wagon running gear and has for its object to provide a construction of this character which will prevent fracture of the fifth-wheel of a wagon when traveling over uneven ground and which will permit the bed of the wagon to remain level.

The invention resides in the formation of the perch-pole of the wagon in two sections and connecting the same in such a manner that the front and rear axles of the vehicle may lie at different angles, and the invention further resides in pivotally mounting the wagon-bed upon the front spring of the vehicle.

In the accompanying drawings: Figure 1 is a front elevation of a vehicle embodying my invention. Fig. 2 is a side elevation of the same, and, Fig. 3 is a detail perspective view of a portion of the perch-pole of the vehicle and showing the connection for the sections of the same.

Referring to the drawings, the numeral 5 denotes a perch-pole of the ordinary construction which is divided as at 6 to form two sections which are connected by means of a coupling. One member of the coupling comprises a plate 7 which is attached to one end of one of the sections of the perch-pole by means of bolts or other fastening devices 8. Extending upwardly and thence forwardly from one end of the plate 7 is a pintle 9 which is provided at its extreme forward end with a head 10 and intermediate its ends with a collar 11. The other member of the connection for the perch-pole section comprises a plate 12 provided with spaced apertured lugs 13 through which the pintle 9 of the first-named member of the connection is engaged, the head 10 being arranged to lie against the forward face of the forward apertured ear and the collar 11 being arranged to lie against the rear face of the rear apertured lug 13. It will thus be seen that the front and rear axles of the vehicle may, by reason of the above-described connection, lie at different angles to each other thereby permitting the bed of the vehicle to remain level during the passage of the vehicle over rough or uneven ground.

The numeral 14 indicates the front axle of the vehicle and 15 the front springs thereof. Secured to the upper bow of the spring 15 is a yoke member 16 including spaced arms between which is pivotally mounted a beam 17 upon which rests the bed 18 of the wagon. It will thus be seen that the front axle may assume various angles with respect to the bed 18 of the wagon.

What is claimed is:

In a vehicle, in combination, a bed, front and rear axles, a rocking connection between the bed and the front axle, a perch pole formed in sections and connecting said front and rear axles, a plate secured to one of the sections, a pintle member formed integral with the plate and projecting therebeyond and arranged to overlie the adjacent end of the other section, a plate carried by the other section, perforated ears carried by the plate, the said pintle being engaged through the ears, a head formed at the extreme end of the pintle and abutting one of the ears, and a collar formed on the pintle intermediate its head and attaching plate and abutting the other ear.

In testimony whereof, I affix my signature, in presence of two witnesses.

ALLEN D. BROONER.

Witnesses:
    W. A. BROONER,
    S. P. GILMOUR.